July 21, 1936.  G. E. WALLIN  2,048,629

SAW GAUGE FOR PRINTERS' TABLES

Filed Feb. 5, 1935  3 Sheets-Sheet 1

Inventor

G. E. Wallin

By Arthur H. Sturges  Attorney

July 21, 1936.   G. E. WALLIN   2,048,629
SAW GAUGE FOR PRINTERS' TABLES
Filed Feb. 5, 1935   3 Sheets-Sheet 2
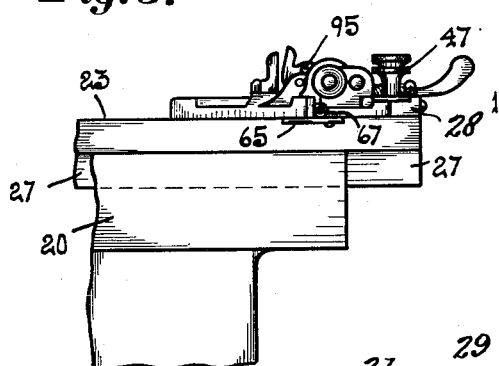
Fig. 3.
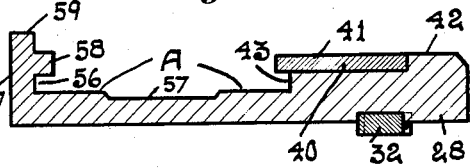
Fig. 6.
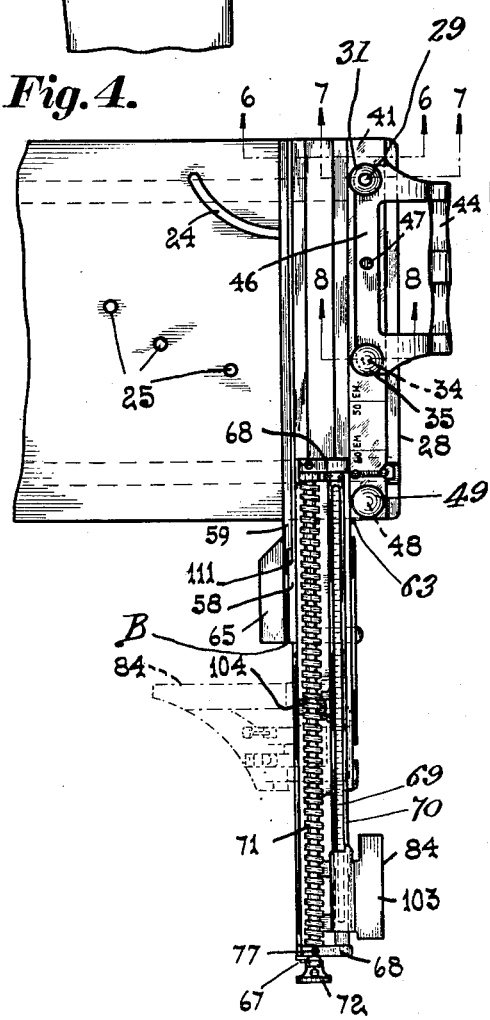
Fig. 4.
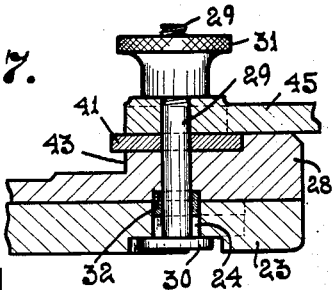
Fig. 7.
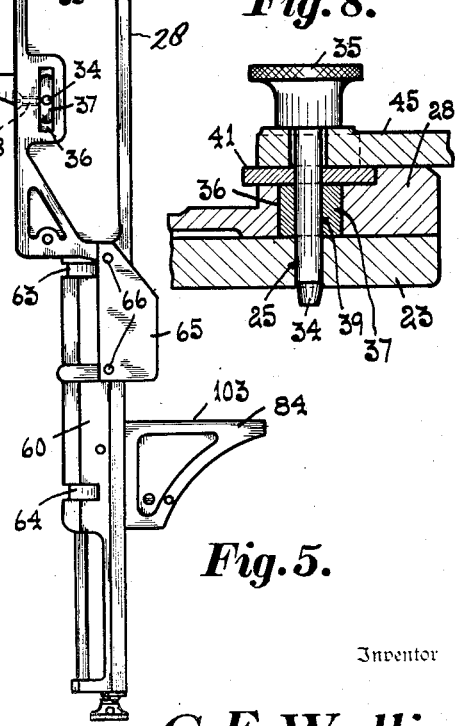
Fig. 8.
Fig. 5.
Inventor
By G. E. Wallin
Arthur H. Sturges  Attorney

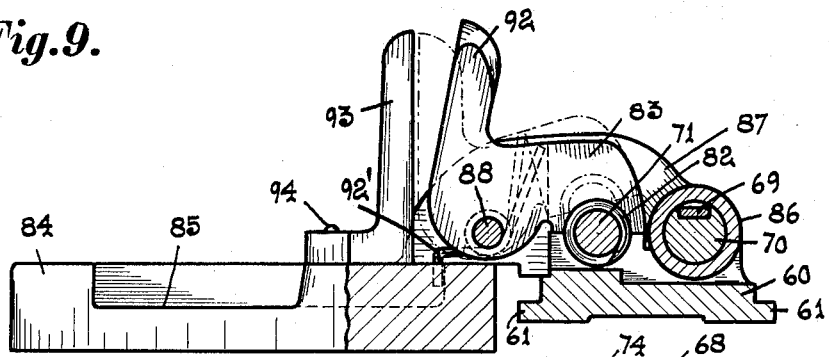
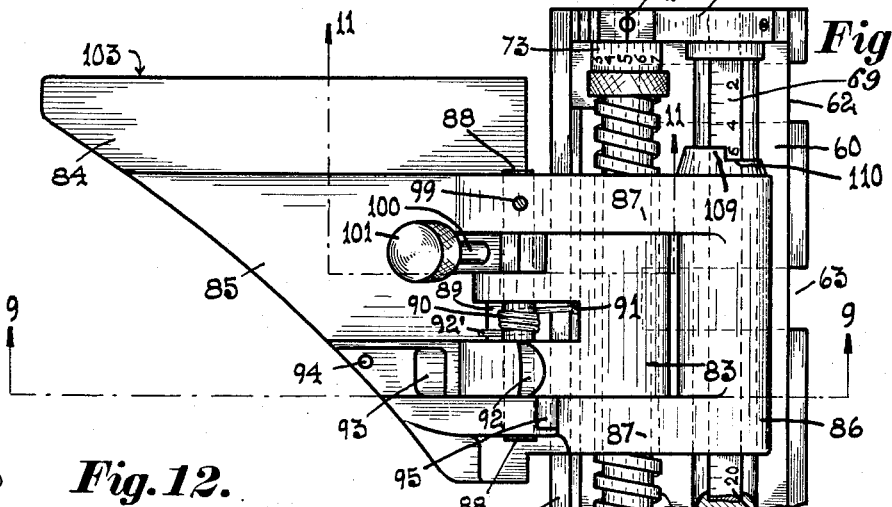
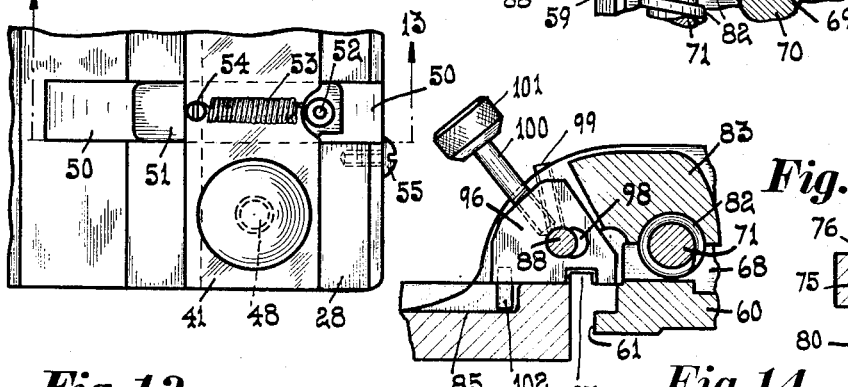
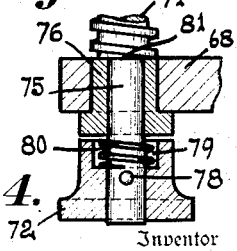
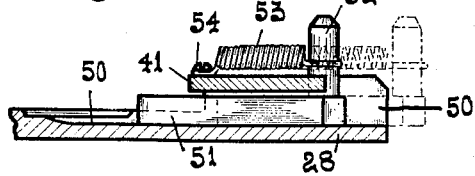

Patented July 21, 1936

2,048,629

UNITED STATES PATENT OFFICE 2,048,629

SAW GAUGE FOR PRINTERS' TABLES

Gustaf E. Wallin, Omaha, Nebr.

Application February 5, 1935, Serial No. 5,101

5 Claims. (Cl. 29—67)

This invention relates to printers' saw tables, and more particularly to an adjustable gauge provided with a pica em scale therefor.

The new gauge is particularly adapted for use in conjunction with an adjustable vise jaw such as is illustrated and described in my copending application Serial No. 736,885 for Saw table vise, filed July 25, 1934, and it is also adapted for operation with a saw table top such as is specified in the Miller Patent No. 986,485 issued March 14, 1911.

It is an object of the invention to provide a gauge having an em scale, whereby the gauge is adjustable to ems and fractions thereof for accurately sawing and trimming printers' materials such as linotype slugs, rules, borders and the like, said scale being so positioned that it may be readily seen while embedded in a carrying member while the scale is protected against wear and obliteration.

A further object of the invention is to provide a slidable gauge member which may be readily and precisely adjusted and locked in a selected position, the parts thereof being so arranged that metal shavings from the saw are prevented from affecting the operation thereof.

A still further object of the invention is to provide an adjustable device for the purposes mentioned, having a gauge which is hingedly attached for swinging the gauge out of the way at times when it is desired to sever comparatively long pieces of work.

Another object of the invention is to provide spring brake means for preventing the vibration generated by the saw table from dislodging a selected adjustment of the device during cutting and trimming operations of printers' materials.

A further object of the invention is to provide a gauge device which may be readily extended for sawing long strips of material and having a supporting rest for such material, said device having a handle for moving the work and device toward the saw, said device and handle so arranged for protecting the operator's hand and preventing the contact thereof with the saw.

A still further object of the invention is to provide a gauge device having compensating means whereby the new gauge may be accurately attached to old and worn saw tables.

Another object of the invention is to provide an adjustable em scale capable of quick coarse adjustment and subsequent fine adjustment so that long and short pieces of work may be quickly and accurately handled, and wherein relatively slidable parts are employed which may be locked in adjusted position.

Other and further objects and advantages of the invention will be understood from the following detailed description thereof, reference being had to the accompanying drawings, in which:

Figure 3 is a fragmentary enlarged end view of the new device mounted on the saw table.

Figure 4 is a top plan view thereof with the new device fully extended and with its end gauge swung to a raised position.

Figure 5 is a bottom plan view of the new device.

Figure 6 is a detail enlarged cross section taken on the line 6—6 of Figure 4.

Figure 7 is a like view on the line 7—7 of Figure 4.

Figure 8 is a detail enlarged cross section taken through the intermediate portion of the device on the line 8—8 of Figure 4.

Figure 9 is an enlarged transverse section through the device on the line 9—9 of Figure 10.

Figure 10 is an enlarged top plan view of a portion of the extensible frame with the end gauge in normal position.

Figure 11 is a detail enlarged section through the same on the line 11—11 of Figure 10.

Figure 12 is a fragmentary top plan view of a portion of the main frame of the device, showing a latch employed for securing the main frame to an extensible frame.

Figure 13 is a transverse section taken through the same on the line 13—13 of Figure 12, and Figure 14 is an enlarged detail section taken through the outer end of the slide frame and the worn shaft mounting.

Figure 1:
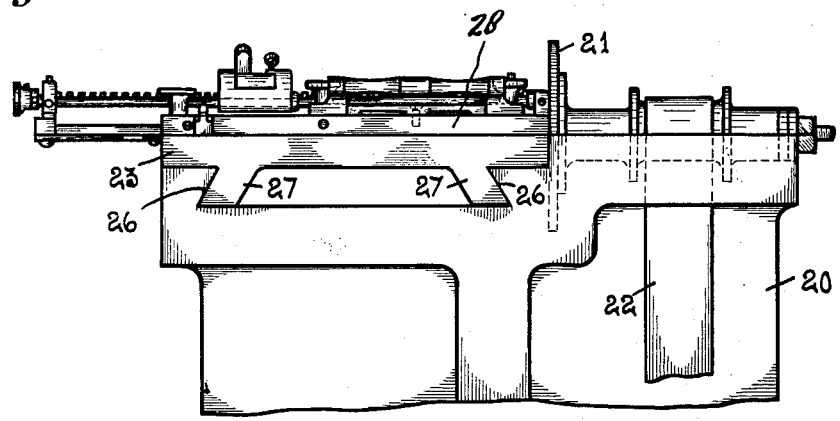
Figure 1 is a fragmentary end elevation of the upper portion of a printer's saw table with the new device mounted thereon.

Referring now to the drawings and first particularly to Figures 1 to 8, 20 designates a printer's saw table provided with a rotatable saw 21 driven by a belt 22. The saw table 20 remains in a fixed position and has a table top 23 which is smooth and provided with an arcuate slot 24, Figure 4, and a plurality of concentrically arranged apertures 25; all of which is old in the art.

The apertures 25 and slot 24 are employed when it is desired to miter cut printers' border line slugs, and after the table has been in use for some time, the margins of said apertures become worn to such an extent that a conventional gauge can not be accurately used. The new invention contemplates a compensating device for accurately positioning the gauge of the present invention with respect to worn slots and apertures of old table tops.

Figure 2:
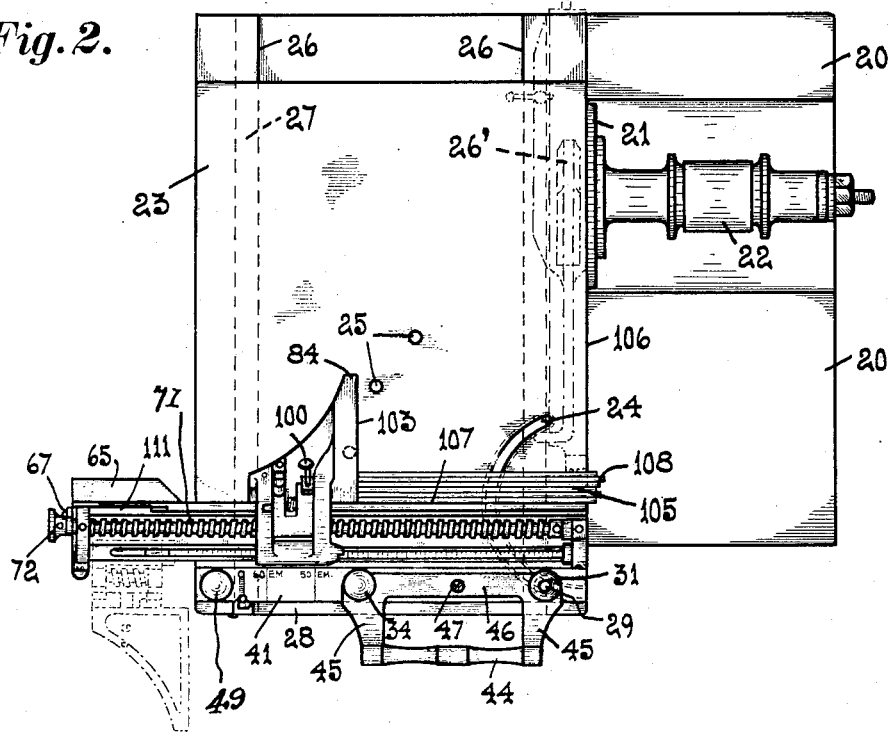
Figure 2 is a top plan view of the same.

The dotted lines 26', Figure 2, indicate a work holding vice such as is described in detail in my co-pending application above mentioned, and the new gauge is particularly adapted to operate in conjunction with said vice. It will be understood that when printers' materials are clamped between said vice and the new gauge that said materials may be moved against the rotating saw 21 for trimming and severing said materials, the latter sliding upon the smooth surface 23 of the table top. The top 23 is movable longitudinally of the table, and as best shown in Figure 1 the table is provided with oppositely disposed inclined guides 26 which receive legs 27 of the top 23 for guiding the top in alinement with the saw 21 and for carrying the printers' material against the saw for trimming purposes.

The new gauge includes a frame 28 adapted to be positioned on and attached to the slidable table top 23. As shown in Figure 7, the arcuately shaped slot 24 of the table top 23 receives therethrough a stud 29 which also extends through the frame 28 and is provided at one of its ends with a head 30 and at its opposite end with a knurled nut 31. The slot 24 is step cut as shown in Figure 7 so that the head 30 is countersunk. In old table tops the margins of the slots 24 become worn and the present invention provides an arcuate filler or shim 32 to fit in the slot 24 and accurately position the stud 29 with respect to the table top 23, said shim 32, as best shown in Figure 5, being riveted to the bottom of the frame 28 as at 33. As shown in Figure 6 the shim 32 is at least partly countersunk in the body of the frame 28.

As best shown in Figures 4 and 8, substantially midway between the ends of the frame 28 there is a removable pin 34 provided with a head 35 which is adapted to be positioned through or within one of the apertures 25 of the table top 23. The pin 34 extends through the frame 28 for cooperation with the stud 29 in positioning the frame 28, in one position of adjustment, at right angles to the saw 21, and for this particular position the aperture 25 of the table top which is closest to the rear edge of the table is employed, said aperture being in alignment with that end of the slot 24 which is closest to said rear edge of the table top.

When the frame 28, together with later described devices which are mounted thereon, is swung to an inclined position with respect to the table top 23 for making miter cutting border slugs and the like, the pin 34 is inserted in a selected aperture 25 in accordance with the radius or degree of said miter cut which, if of substantially 45 degrees, is engaged in the aperture 25 which is furthermost from the rear edge of the table top.

In use, the apertures 25 also become enlarged and distorted like the slot 24 and when the new gauge is to be applied to old table tops, the apertures 25 being already worn so that accurate adjustment is not possible, by means of the present invention said worn apertures 25 may still be utilized for an accurate positioning of the new gauge by means of a compensating device now to be described.

As best shown in Figures 5 and 8, there is a longitudinal aperture 36 in the frame 28 within which is snugly received a slidable block 37 which may be selectively positioned in the aperture 36 and held when adjusted by means of a set screw 38 carried in the side of the frame 28 as shown by the dotted lines in Figure 5. The block 37 has an intermediate aperture 39 for receiving the pin 34 and the pin 34 may be positioned with respect to worn walls of the apertures 25 of the table top for accurately compensating for wear on the parts and for correctly disposing the frame 28 upon and with respect to the table top 23 in conjunction with the center stud 29 and its compensating device. This compensating structure provides means for making square cuts and also accurate miter cuts of the materials.

As best shown in Figure 6, the surface of the frame 28 is provided with a step cut ledge 40 for receiving thereon a plate 41 with its upper surface flush with the upper surface 42 of the frame 28. The plate 41 extends beyond the ledge 40 and provides a subjacent groove 43 for purposes later described.

A handle 44 extends rearwardly and upwardly from the plate 41 and has side arms 45 carried by an inner cross piece 46 which is secured to the plate 41 by a screw 47. The stud 29 extends through the inner end of one of the arms 45 as shown in Figure 7 and it will be understood that when the nut 31 is tightly screwed down the handle 44, the plate 41 and the frame 28 are locked to the table top 23 adjacent the stud 29.

As shown in Figure 8, the pin 34 is loosely disposed through the other arm 45 of the handle. The handle is rigidly secured to the plate 41 by the screw 47 and the nut 31 of the pin 29, and the plate 41 adjacent its end opposite to the stud 29 is secured to the frame 28 by a removable set screw 48 which extends through an aperture in the plate and is threadedly received in the frame 28, said set screw 48 being provided with a knurled and comparatively large head 49, best shown in Figure 3, whereby the operator can remove the set screw 48 together with the nut 31 of the stud 29 for removing the plate 41 and handle 44 from the frame for various purposes.

As best shown in Figures 12 and 13, the frame 28 adjacent the set screw 48, is provided with a transversely disposed slot 50, the ledge 40 and frame 28 being incised for this purpose. The slot 50 receives a reciprocable or slidable bolt-latch 51 which is snugly received in the slot and is held from upward movement by the plate 41. The latch 51 is provided with a stud 52 having a spring 53 attached between it and a keeper or screw 54, the latter being threaded in the plate 41 to retain the latch 51 in a normal position as shown in Figures 2, 12 and 13. The latch 51 shown in Figures 4, 12 and 13 is adapted to normally lock later described parts to and with respect to the frame 28, and may be withdrawn as shown in dotted lines in Figure 13 against the tension of the spring 53 for releasing the parts.

As best shown in Figure 12, a side of the latch 51 is recessed to receive a stop screw 55 when the latch is retracted and to provide a shoulder to engage the screw 55 and prevent the complete removal of the latch 51 from the slot 50.

Referring to Figure 6, the frame 28 is provided with an elongated groove 43 by means of the plate 41 extending beyond the ledge 40 and a similar groove 56 is provided opposite to the groove 43. Said groove 56 is disposed between the bed 57 of the frame 28 and an overhanging rib 58 which is integral with the frame 28. The side wall or edge of the frame 28 which provides a support for the rib 58 extends upwardly beyond said rib 58 to provide a locking rail 59 for an adjustable end gauge arm later described.

The rail 59, rib 58, plate 41 and grooves 56 and 43 extend the entire length of the frame 28, the bed 57 thereof having machined or planed surfaces A for slidingly receiving thereon an extensible sub-frame 60 which, as best shown in Figure 9, is provided at its longitudinal lateral edges with longitudinally and oppositely disposed lugs 61 which are slidably received in the guide grooves 43 and 56 of the main frame 28.

The lug 61 which is disposed adjacent to the plate 41 is provided near one end and upon its under side with notches 62 and 63, Figure 10, which open into slots as shown by the dotted lines, said slots or notches adapted to receive the heretofore described latch-bolt 51 at times when the sub-frame is extended with respect to the main frame as later described.

As best shown in Figure 5, the sub-frame 60 is provided with a similar notch 64 positioned adjacent the outer end of said sub-frame which also is adapted to receive the latch-bolt 51.

As best shown in Figure 4, a rest 65 is provided for elongated border slugs and as shown in Figure 5, the rest 65 comprises a plate secured to the bottom of the sub-frame by rivets 66.

The outer end of the sub-frame 60 is provided with a stop 67, best shown in Figures 2, 3 and 4, which is adapted to abut against the end of the rib 58 of the main frame 28 and prevent one frame from too great a movement with respect to the other, said stop 67 functioning at times when it contacts with that end of the rib 58 indicated at B in Figure 4. By this means the sub-frame is prevented from extending beyond that edge of the slidable table top 23 which is in alignment with the saw 21 for preventing a detrimental contact between the saw 21 and the sub-frame 60.

At each end of the sub-frame are upstanding lugs 68 which provide a mounting for an em scale housing bar and a journal mounting for a rotatable worm screw. The em scale 69 is, as best shown in Figure 9, countersunk into a rigid housing member 70 which is circular in cross section to provide a pivotal mounting for a swinging and sliding later described end gauge arm.

The figures and lines of demarkation of the em scale are protected against obliteration and defacement, incident to the use of the device, by countersinking the em scale within a protecting surface of its housing 70.

In alignment with the housing 70 a rotatable worm screw 71 is positioned. The outer end of the worm screw 71 is provided with a knurled nut 72 for facilitating manual rotation of the worm screw. The inner end of the worm screw 71 is provided with a rotatable scale 72, as best shown in Figure 10, for use in estimating fractions of an em. The fractional scale 73 comprises a collar which encircles the worm screw shaft 71 and is provided with lines of demarkation having numerals adjacent said lines for indicating ems or fractions thereof. The collar is secured to the worm shaft by any suitable means, not shown, such as a set screw or the like. Adjacent the collar a notch or line 74 is provided upon the lug 68 of the sub-frame 60 for co-operation with the demarkations of the collar 73.

The inner end of the worm screw shaft 71 is reduced in diameter as compared to the diameter of the worm screw.

There is a brake or stop for the worm shaft 71 which is best illustrated in Figure 14. The worm shaft 71 is provided at its outer end with a reduced pintle end 75 which extends through a bearing 76 carried by the outer lug 68 to provide a journal mounting for the shaft, said bearing 76 being held stationary with the lug 68 by a set screw 77 as shown in Figure 4.

As shown in Figure 14 the knurled nut 72 is fixed to the pintle end 75 of the shaft 71 by a removable dowel pin 78. The nut 72 is provided with a recess 79, opening toward the bearing 76 and within which a small coiled spring 80 is positioned encircling the pintle end 75 and bearing against the nut 72 and the bearing 76 for normally urging the shaft 71 outwardlly, whereby the shoulder 81 of the screw frictionally engages against the bearing 76 or lug 68. By this means the spring 80 permits the shaft to be manually rotated while at the same time preventing it from rotating incident to vibration caused by the belt 22 and the saw 21 which otherwise would affect a selected minute precise adjustment of the em gauge arm and the accurate sawing of the linotype slugs or printer's material to a selected length.

The worm shaft 71 is provided with a worm thread 82 which is preferably rectangular in cross section, providing what is known as a "square thread". The thread 82 meshes with a pivotally mounted worm shoe 83 as best shown in Figure 11. It will be understood that the worm shoe 83 rests upon the worm for a removable contact therewith and that the thread engaging portion of the shoe spans over and contacts with an area of the worm shaft and thread equal to one-half its diameter.

An end gauge 84 is provided with an arm 85 having a sleeve 86 which, as best shown in Figure 10, encircles the member 70 which houses the em scale 69. The member or rod 70 is circular in cross section and thus provides a pivotal mounting for the arm 85 and end gauge 84 which may be swung upwardly for disengaging the shoe 83 from the thread 82 of the worm shaft 71, whereby the end gauge may be moved rapidly longitudinally of the device for rough adjustments as later mentioned. The sleeve 86 is formed integral with the end gauge arm 85 and is connected thereto by means of spaced apart legs 87 between which the worm shoe 83 is positioned.

There is a shaft 88 disposed through and between the legs 87 which provides a pivotal mounting for the worm shoe 83 between the legs 87, the latter holding the shoe 83 from shifting on the shaft 88.

The shoe 83 is bifurcated adjacent the shaft 88, providing a notch 89 in which is placed a coiled spring 90 having an end 91 which bears against the worm shoe 83 and an end 92' which bears against or is secured to the upper surface of the arm 85 so that the spring urges the shoe 83 into normal contact with the threads of the worm screw shaft 71.

The shoe 83 is provided with means for raising it out of contact with the worm screw 71, said means comprising an upstanding lever 92 which is integral with the shoe. As best shown in Figure 9, the lever 92 is adapted to engage an abutment 93 carried by the arm 85 and secured thereto by a rivet 94 or the like. To raise the shoe out of contact with the worm the operator may place his thumb upon the abutment 93 and the knuckle of his forefinger upon the lever 92 for moving the latter against the abutment and raising the shoe, said abutment functioning as a stop to prevent too great a movement away from the shoe as well as facilitating the limited operation.

The shoe 83 is provided with a stop pin 95 which, as best shown in Figures 3 and 10, contacts with and against an adjacent leg 87 of the sleeve 86 and limits the downward movement of the shoe under urge of the spring 90 for the purpose of preventing the threads of the shoe from engaging too deeply with the threads of the worm which, if deeply engaged, would tend to prevent an upward swinging movement of the arm 85 at desired times and for purposes later mentioned.

Means are provided for locking the arm 85 in a selected position midway between the ends of the worm shaft 71, or midway between the ends of the em scale 69, for positioning the end gauge 84 in a fixed position while so locked, said lock being employed at times when it is desired to cut a large number of printers' material slugs all of the same length, said cutting extending over an appreciable length of time. Said locking means not only prevents unauthorized persons from disturbing the selected positioning of the end gauge 84 but also prevents such disturbance incident to vibration caused by the saw 21, its belt 22 and the movable parts of the machinery of the saw table 20.

The said locking means includes the heretofore mentioned locking rail 59, best shown in Figures 6 and 10, against a side wall of which a locking finger 96 is adapted to be clamped. As best shown in Figure 11, the locking finger 96 is provided in its lower edge with a notch or transversely disposed slot 97 within which the locking rail 59 is received at times when the arm 85 is in a lowered position, as shown in Figure 2. A side wall of the notch 97 is adapted to engage against a side wall of the rail 59 and be clamped in such engagement.

The locking finger 96 is provided with an elongated aperture 98 through which the shaft 88 extends, said shaft being held from longitudinal movement by a set screw 99. The finger 96 is provided with a rotatable threaded screw 100 having a knurled head 101 to facilitate rotating the screw, and the latter extends through the finger to the heretofore mentioned aperture 98 thereof. By rotating the screw 100 until its inner end bears against the shaft 88 the finger 96 is moved to the position shown in Figure 11 whereby the heretofore mentioned side wall of the notch 97 becomes rigidly engaged with a vertical side wall of the locking rib 59, preventing the arm 85 from being swung upwardly out of its selected position of adjustment. When the screw 100 is released the finger may move transversely of the shaft 88 for releasing said locking engagement.

The locking finger 96 is provided with a downwardly projecting stud 102, best shown in Figure 11, the free end of which rests upon the upper surface of the arm 85 for maintaining the heretofore mentioned side wall of the notch 97 in alignment with the side wall of the locking rail 59.

The end gauge 84 carried by the arm 85 is provided with a smooth surface 103 which is vertically disposed, in use, and when swung downwardly upon the table top 23, said vertical surface 103 is positioned at a true right angle with respect to the frame 28, sub-frame 60, worm shaft 71 and the em scale carrying member or housing 70, and this is assured by the compensating devices 32 and 37. As best shown in Figure 4, midway between the ends of the worm shaft 71, the latter is provided with a rest 104 to hold the shaft 71 from lateral movement while permitting rotary movements thereof. The threads 82 of the worm bear and rotate upon said rest 104.

In operation, the device being positioned upon the table top 23, the work or printers' material 105 is placed thereon as shown in Figure 1. The operator now manipulates the nut 72 for rotating the worm shaft 71 and causing the surface 103 of the end gauge 84 to move longitudinally of the device to aline the abutting ends of the work evenly at their outer ends and cause the uneven and undesired ends of the work to project over the edge 106 of the table top and in line with the saw 21. At this time the vise 26' is manipulated for clamping the work between its movable jaw and the vertically disposed edge-surface 107 of the frame 28. The operator now grasps the handle 44 and slides the table top 23 forwardly, together with the work 105 clamped thereon, against the rotating saw 21 for severing the undesired ends 108 of the work.

The work is thus cut to predetermined selected lengths, said lengths being ascertained by means of the em scale. Referring to Figure 10, the em scale 69 is in a relative position with respect to the end gauge for severing the work to a six em length which is ascertained by means of the alignment of the tapered end 109 of the sleeve 86 with the demarkation of the scale, shown in alignment with the numeral 6 of the scale. Said tapered end 109 is provided with a step-cut 110 whereby the numeral 6 may be readily seen. The end gauge 85 extends laterally of the arm 85 a distance which is equal to the space occupied by the frictional scale 73 and the upstanding lugs 68 of the sub-frame 60. The sub-divisions of the scale 73 are of 1 em length and the end gauge may be adjusted for fractions of ems by means of the calibrated fractional scale 73.

When it is desired to cut a large number of slugs all of an equal length the screw 100 is manipulated for locking the end gauge arm 85, the sub-frame 60 and the main-frame 28 together as heretofore described, said main-frame being clamped in a stationary position to the table top 23. For the above described operations the bolt-latch 51 registers with the notch 64 for locking the frame 28 and sub-frame 60 together.

For cutting long lengths, such as border materials, the bolt latch 51 may be withdrawn from the heretofore mentioned slot 64 and the sub-frame extended with respect to the main frame, the bolt being latched in within either one of the notches 62 or 63, provided at the end of the sub-frame 60 adjacent the fractional scale 73. Said notches 62 and 63 may be selectively used for purposes later described. When so extended the sub-frame is positioned with respect to the main frame as shown in Figure 4, the end gauge 84 occupying the dotted line position shown in Figure 4 for sawing border slugs; whereupon the length of the slugs when sawed is selected by means of rotating the worm screw 71 as heretofore described.

When it is desired to saw wood printer's filler blocks, which are generally cut from a hard close grained wood, initially long planks or boards of the same must be trimmed and for this purpose the end gauge 84 is swung upwardly out of the way from the dotted line position shown in Figure 4 to the full line position thereof, whereupon an extremely long board may be severed by means of the saw.

When sawing elongated border slugs, portions midway between the ends thereof may rest upon and be supported by the rest 65 which, as shown in Figures 1, 2 and 4, is always extended beyond the side edge of the table top, the top of the rest 65 being in accurate alignment with the top surface or plane of the table top 23.

Referring to Figures 2 and 4, upon the upper surface of the heretofore mentioned plate 41 there is imprinted or cut thereon lines of demarkation adjacent which the legend "60 em" and "50 em" appear. The "60 em" mark co-operates with a notch 63 provided in the sub-frame 60 and similarly the "50 em" mark co-operates with the notch 62 thereof whereby the sub-frame may be extended with respect to the main frame for positioning the bolt-latch 51 in either the notch 62 or 63 for locking the frame and sub-frame with respect to each. Thus, a selected length of 50 or 60 em is provided and to said number of ems the operator adds required additional ems by rotating the worm shaft 71 as heretofore described for gauging and cutting a longer border slug.

As heretofore practiced in the art extensible gauge devices were composed of two separated parts which, in order to utilize a co-operation and extension thereof, had to be attached together and when extending said old device for incising elongated line slugs the operator would extend said devices for providing a 50 em length slug to which would be added a fractional part of 50 ems. In use the present invention provides an extra 10 em length whereby the operator may selectively use a 50 em or 60 em extension as desired.

At times, when the heretofore mentioned worm shoe 83 is extended to the dotted line position shown in Figure 4, or beyond the end of the main frame 28, said shoe 83 at said time is removed from the locking rail 59 and, should the worm shaft 71 be rotated until the worm shoe 83 makes contact with the end of the locking rail 59, the latter would prevent a further movement of the shoe. To prevent this, the locking rail 59 is provided with the washer and screw as indicated at 67 in Figures 2 and 4.

The outer end portion 111 of the locking rail 59 adjacent the lug 58 is beveled as indicated at Figures 2 and 4.

This tapered portion 111 is from the top of the rail 59 downwardly towards the upper surface of the rib 58.

By this means said inclined surface 111 releases further contact of the lug 61 of the sliding frame 60 against the vertical surface of the locking rail 59 and the worm shoe 83 may be lifted off the worm shaft 71 and rotated on its mounting 86 about 270 degrees, whereby the shoe may hang down in a vertical downward position as shown in Figure 4.

It is obvious that various changes and modifications may be made in the details of construction and design of the above specifically described embodiment of this invention without departing from the spirit thereof, such changes and modifications being restricted only by the scope of the following claims:

What is claimed is:—

1. A gauge for saw tables and the like having an arcuate slot and a series of perforations concentric to the slot, comprising a main frame, securing means carried by the main frame for engaging in the slot and perforations of the table to hold the main frame thereto in adjusted position, compensating means carried by the main frame for positioning the same in said slot and perforations to take up wear of the table at the margins of the perforations, an extensible frame on the main frame, means for adjustably holding the extensible frame in adjusted position on the main frame, and a gauge arm adjustably mounted on the extensible frame for adjustment thereon relative to the main frame in various positions of adjustment of the extensible frame.

2. A gauge for attachment to old saw tables and the like having slots and perforations therein worn at their marginal edges, comprising a main frame adapted to be positioned on the table for supporting work thereagainst, clamping bolts carried by the main frame for engagement in the slot and the perforations of the table, compensating devices carried by said main frame for engagement in the slot of the perforations to take up wear at the marginal portions thereof and support the main frame in a true adjusted position on the table, a sliding frame on the main frame, a sliding gauge arm on the sliding frame, means for securing the sliding frame in various adjusted positions, and a fine adjustment means between the sliding frame and the gauge arm for effecting fine adjustments thereof with reference to the main frame.

3. A gauge attachment for saw tables and the like comprising a main frame, means for securing the main frame on the saw table, said main frame having trackways disposed lengthwise thereof, a second frame having ribs projecting into said trackways for interconnecting the frames and permitting sliding movement of the sliding frame, a latch bolt carried by the main frame, an em scale on the main frame, said sliding frame having recesses therein disposed with respect to said em scale for receiving the locking bolt therein to hold the sliding frame at a desired position on the main frame, a worm shaft disposed lengthwise on the sliding frame, a gauge arm slidably mounted on the sliding frame and engaging the worm shaft for operation thereby lengthwise of the sliding frame, a fractional scale mounted on the sliding frame for determining the adjustment of the gauge arm, and a second fractional scale carried by the worm shaft for determining partial turns thereof according to the desired length of the work.

4. A gauge attachment to a saw table or the like comprising a main frame having a longitudinal trackway therein and provided with an operating handle, means for mounting the main frame on the saw table, a sliding frame having ribs projecting into said trackway of the main frame for interconnecting the frames, a latch mounted on the main frame, a scale mounted on the main frame, said sliding frame having slots therein disposed with relation to the scale for receiving a latch therein to hold the frames in desired adjustment determined by the scale, said handle adapted for operation in moving the saw table relative to its saw, a cylindrical bearing member disposed lengthwise on the sliding frame, a gauge arm slidably and pivotally mounted on said cylindrical member, a scale on the cylindrical member for determining the lengthwise adjustment of the gauge arm on a sliding frame, a worm shaft mounted lengthwise in the sliding frame and said gauge arm having a threaded saddle portion detachably engaging the worm shaft whereby turning of the shaft may shift the gauge arm lengthwise of the sliding frame, and a second scale mounted on the worm shaft for determining fractional movements thereof in adjusting the rest to support the work against the gauge arm and the main frame at the desired length.

5. A gauge for attachment to saw tables, comprising a main frame having a guideway therein, a second frame mounted in said guideway for lengthwise movement on the main frame, means for locking the sliding frame in adjusted position on the main frame, a longitudinal bearing member on the sliding frame, a gauge arm having an arm with a cylindrical bearing engaging said bearing member, said gauge arm adapted to be swung into and out of operative position with respect to the main frame and the saw table, a latch device carried by the gauge arm and adapted for operation to secure the gauge arm in adjusted position on the sliding frame, means for adjusting the gauge arm when in operative position lengthwise of the sliding frame, and means for securing the sliding frame in adjusted position on the main frame.

GUSTAF E. WALLIN.